Nov. 21, 1933.　　　　E. P. BURRELL　　　　1,936,447
CONTROL FOR HYDRAULIC OPERATING SYSTEMS
Filed Oct. 8, 1930　　　9 Sheets-Sheet 1

Inventor
Edward P. Burrell
Kwis Hudson + Kent
attys

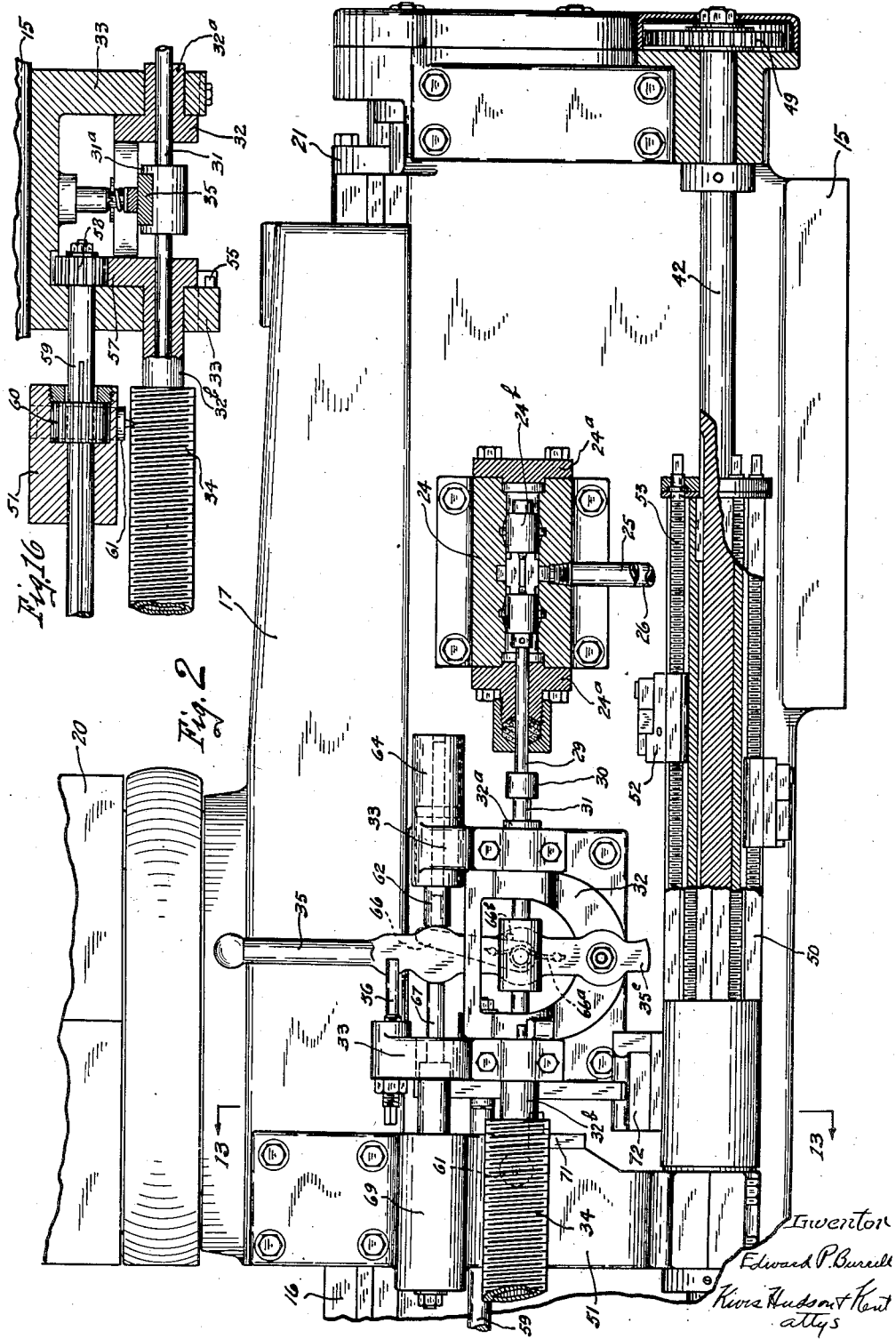

Nov. 21, 1933.  E. P. BURRELL  1,936,447
CONTROL FOR HYDRAULIC OPERATING SYSTEMS
Filed Oct. 8, 1930  9 Sheets-Sheet 3
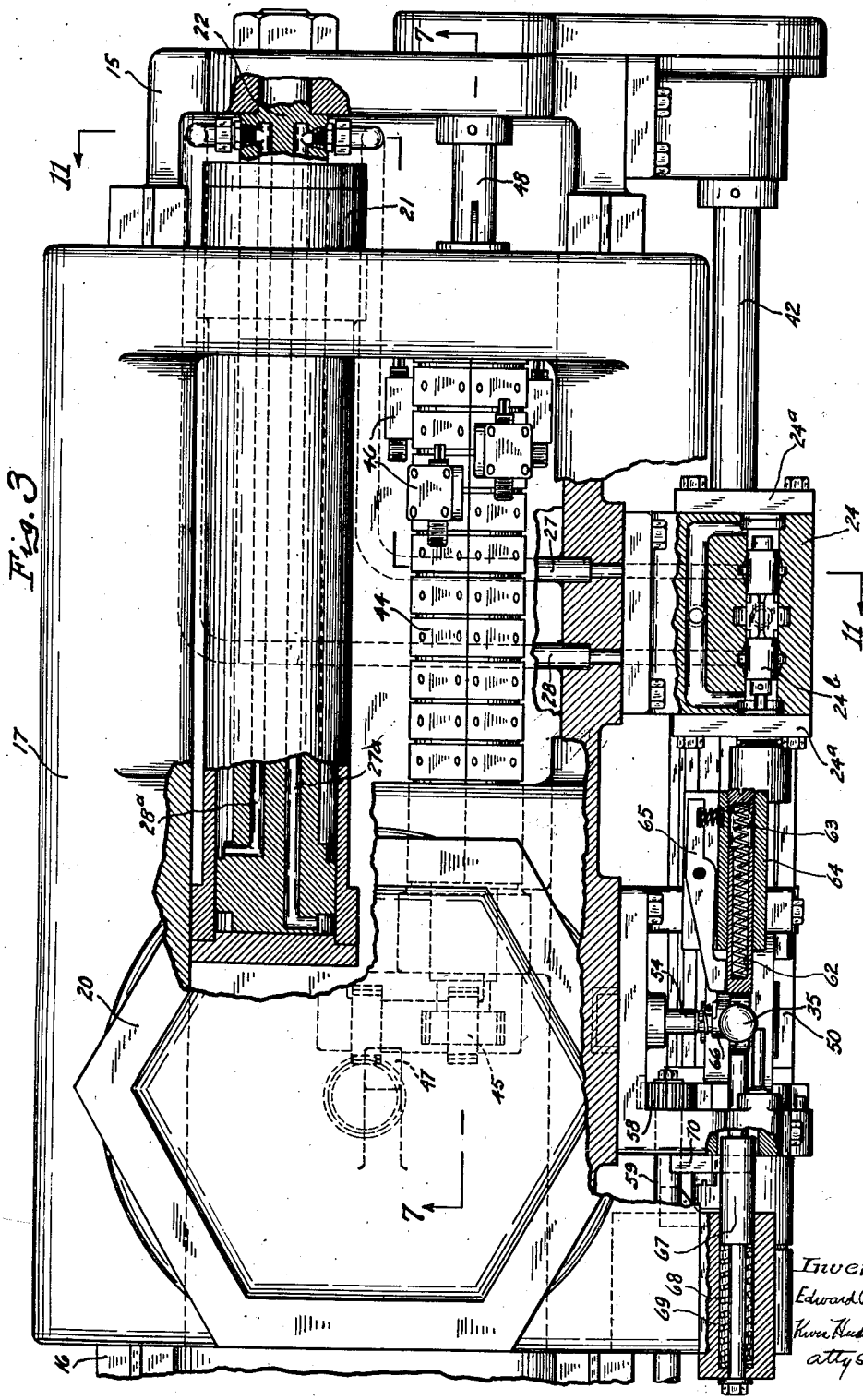

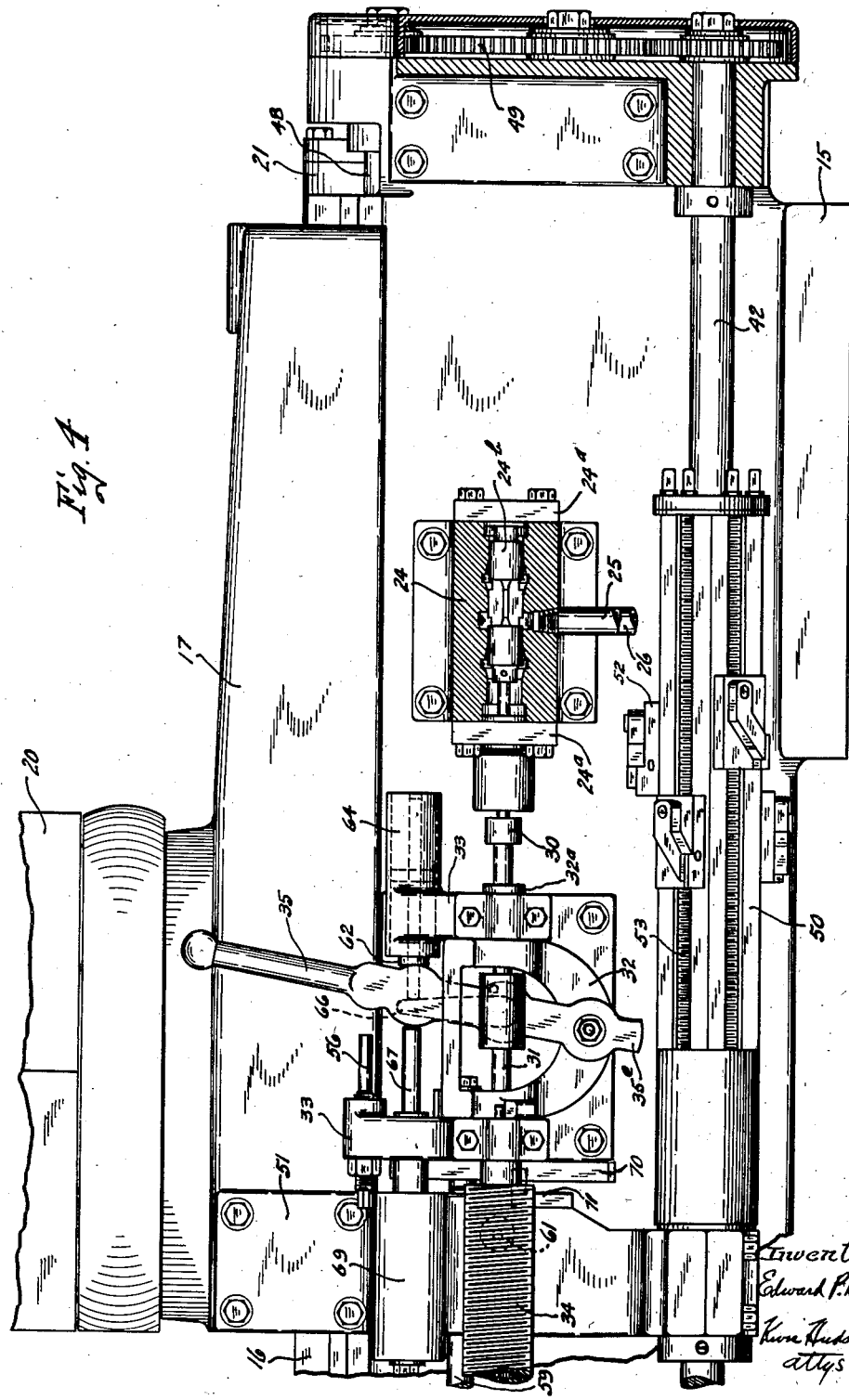

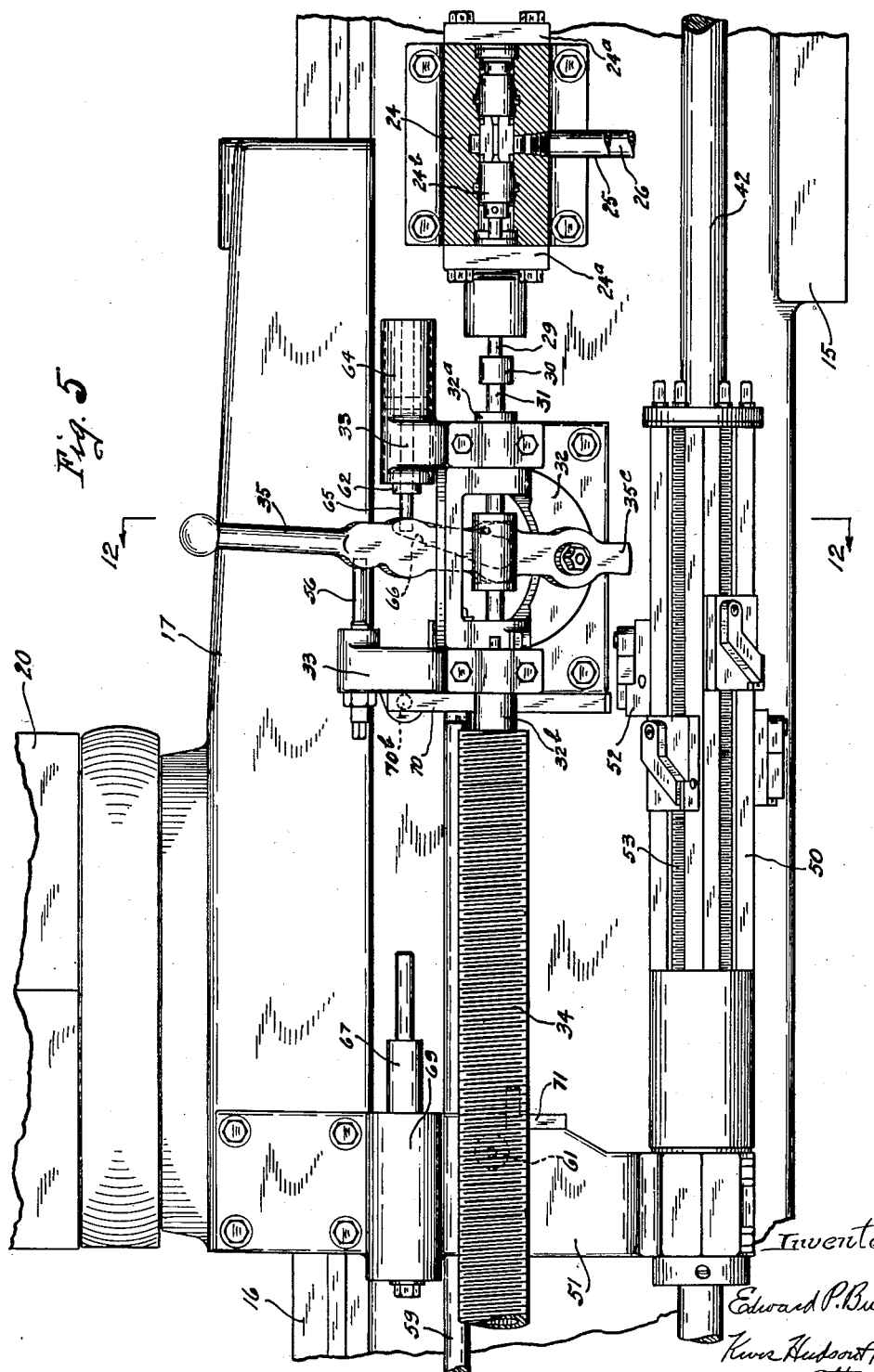

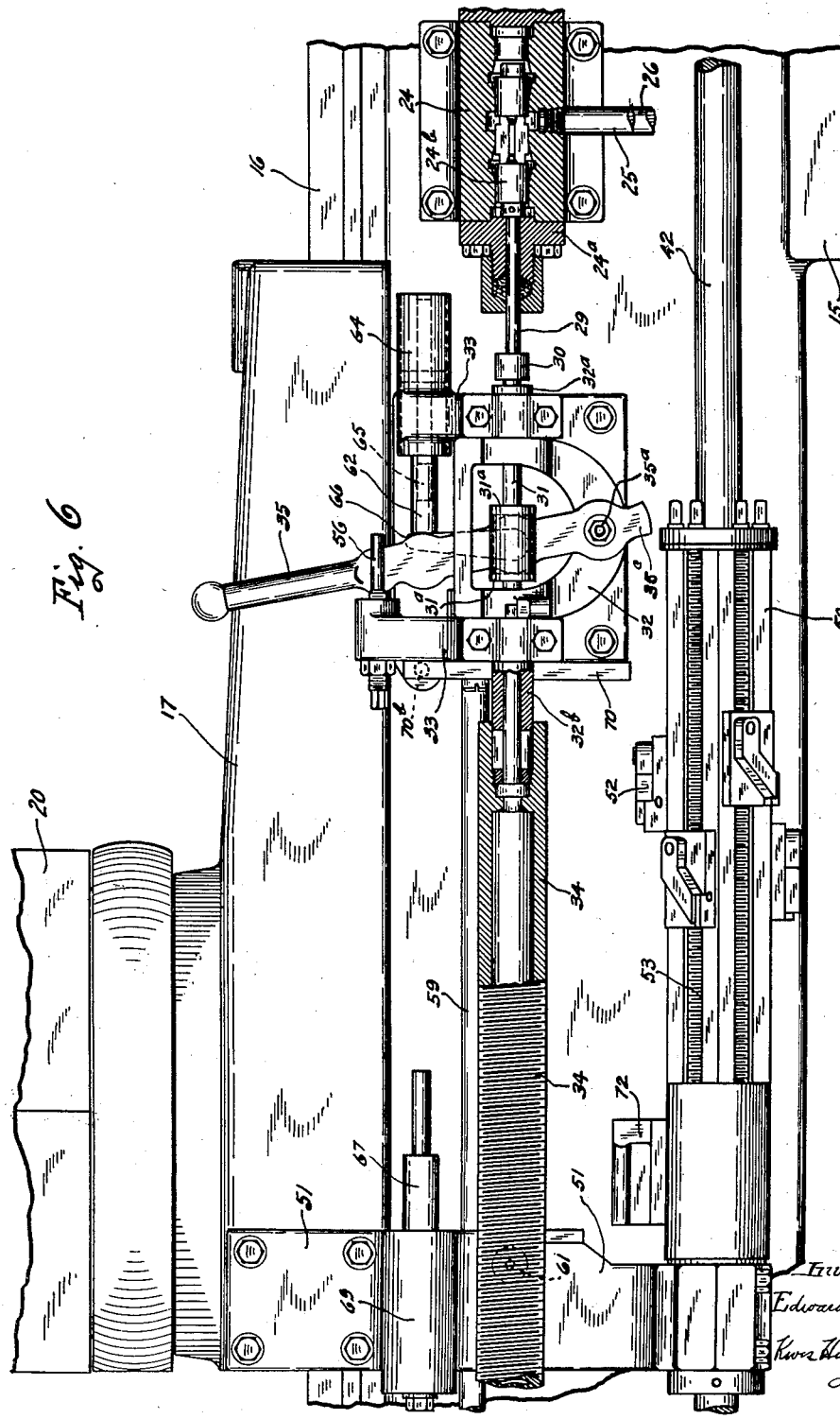

Nov. 21, 1933.  E. P. BURRELL  1,936,447
CONTROL FOR HYDRAULIC OPERATING SYSTEMS
Filed Oct. 8, 1930  9 Sheets-Sheet 7
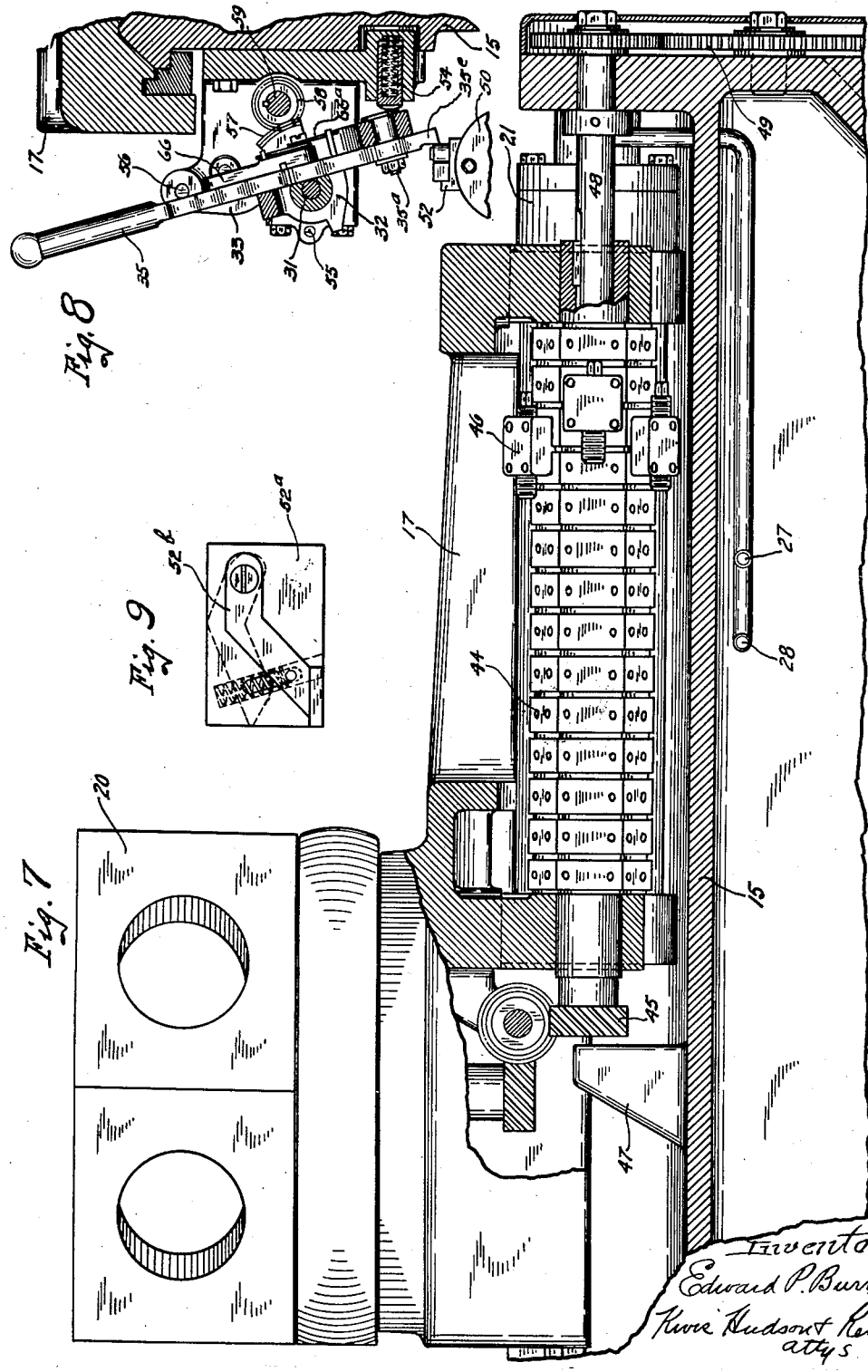

Nov. 21, 1933.  E. P. BURRELL  1,936,447
CONTROL FOR HYDRAULIC OPERATING SYSTEMS
Filed Oct. 8, 1930  9 Sheets-Sheet 8
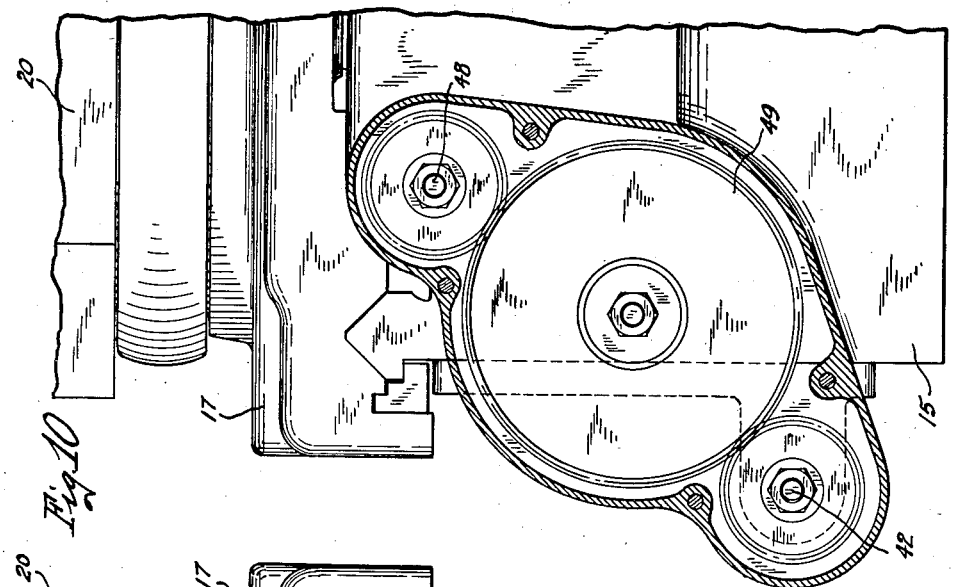
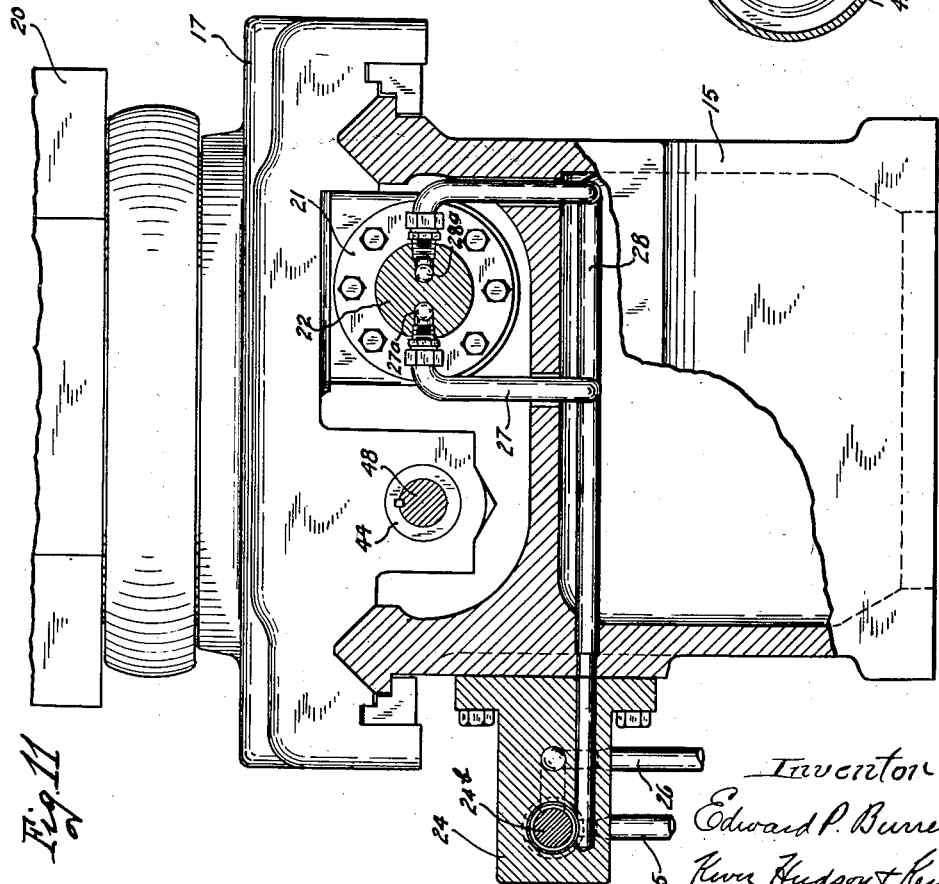
Inventor
Edward P. Burrell
Kwin Hudson & Kent
attys

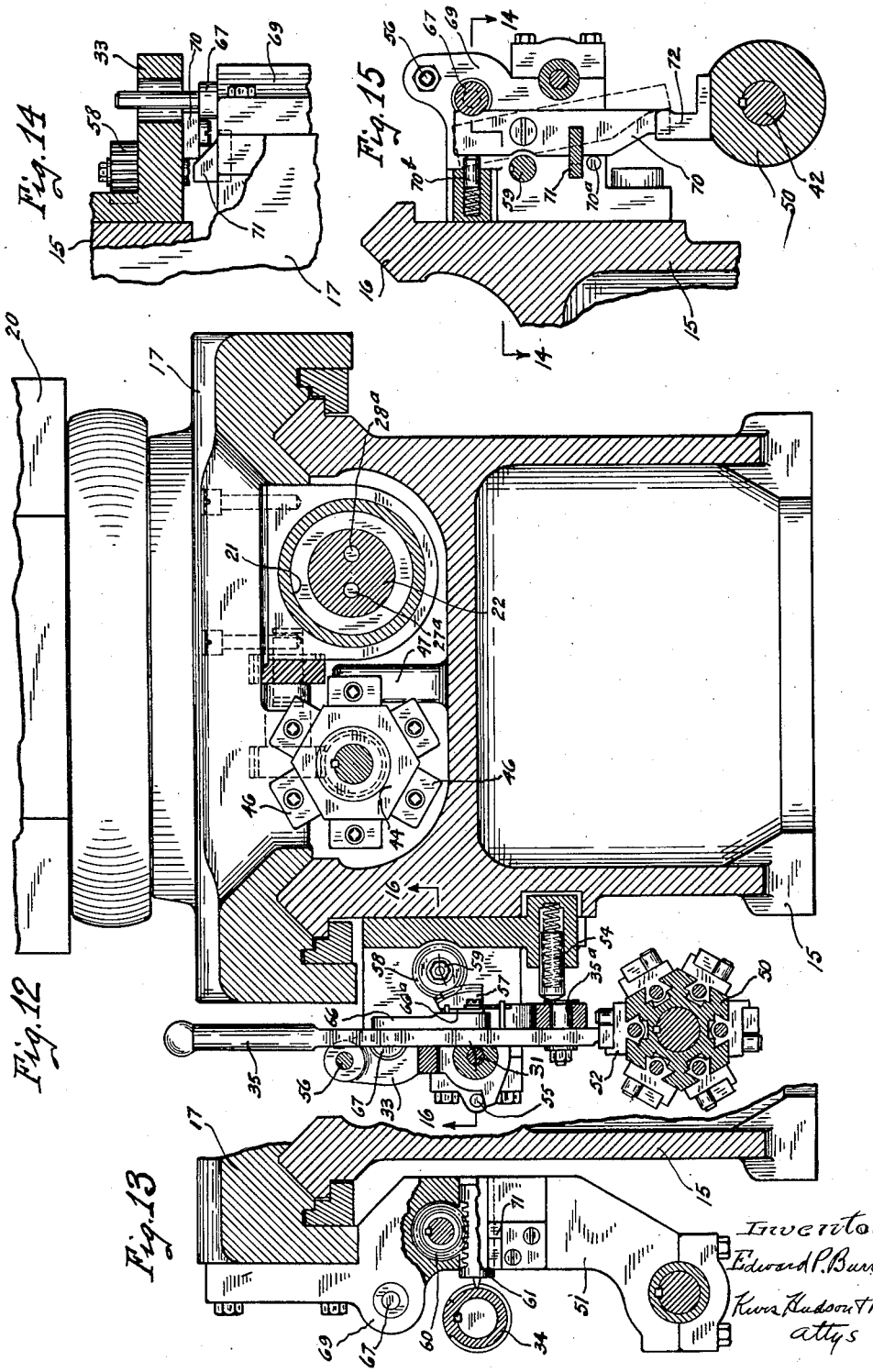

Patented Nov. 21, 1933

1,936,447

UNITED STATES PATENT OFFICE 1,936,447

CONTROL FOR HYDRAULIC OPERATING SYSTEMS

Edward P. Burrell, Shaker Heights, Ohio, assignor to The Warner & Swasey Company, Cleveland, Ohio, a corporation of Ohio Application October 8, 1930. Serial No. 487,179

22 Claims. (Cl. 29—42)

This invention relates to a control for hydraulic operating systems and has particular reference to systems wherein there is at least one hydraulically operated member whose rate of movement is to be controlled. More particularly, the invention relates to a control or control system embodying certain changes, modifications and ways of supporting and actuating various parts of the system with respect to the control system constituting the subject matter of my prior application Serial No. 474,611, filed August 11, 1930.

It is one of the objects of the invention to provide a control such that the hydraulically actuated member will be required to move at a constant speed either throughout its movement or through a predetermined portion thereof, regardless of leakage or variable rate of leakage in any parts of the hydraulic operating system.

A further object is to provide a control wherein the rate of movement of the hydraulically actuated member is automatically varied at points where a variation in rate of movement is desired.

A still further object is to provide for the automatic control of the actuated member in the form of a slide such that the said member is caused to move back and forth with a constant relatively low rate of movement during a portion of its travel and at constant relatively high rate or rates of movement during other portions.

Still further the invention aims to provide a system of control for a hydraulically actuated member such that the member may pass through a predetermined number of cycles of movement and then be automatically stopped, each cycle including forward and return reciprocating motions at varying rates of movement if desired and as desired.

A further object is to provide an adjustable device which will enable the period of dwell or the lapse of a time interval at the end of the movement of the hydraulically actuated member in one direction, and before the initiation of the movement in the opposite direction.

The above and other objects are attained by the present improved system of control, which will be described in the specification and set forth in the appended claims.

My control system may be used to advantage in many different kinds of machines and apparatus, but a particularly important field of use includes machine tools having a reciprocating tool or work holding member which is usually given a relatively slow feeding movement which must be of a constant nature regardless of leakage and regardless of the pressure on the sliding member by the action of the tool or tools on the work, and which is designed to have a relatively fast rate of movement in a forward direction up to a point near where the tool or tools engage the work, and a similar, relatively high rate of movement on the return stroke following the cutting operation or operations. Accordingly, I have illustrated my invention designed for and applied to a machine tool, the particular tool being a turret lathe, and the hydraulically operated reciprocating member being in this instance the turret slide, but it is to be understood that in so illustrating the invention, I do not limit any part or all of the novel features of the present control system to this particular field, i. e., either turret lathes or other machine tools.

In the companion application referred to, the slide is moved back and forth by a piston operating in a cylinder, the piston and cylinder constituting a motor, either element of which may be connected to the slide. The valve has suitable operating connection with the valve lever, the position of which determines the position of the valve, and the rate of flow of the pressure fluid and therefore the direction of movement of the slide and its rate of movement.

The valve and lever are capable of manual operation when desired, but in the normal functioning of the machine tool the lever is automatically actuated to cause a quick forward movement of the slide, then a relatively slow feeding movement which is caused to take place at a constant rate regardless of leakage, then at the end of the feeding movement, the slide is stopped and caused to remain stationary for a suitable time, termed the "dwell", which can be varied as desired, and then is given a rapid return movement.

With the invention applied to a turret lathe, the slide is caused to pass through a number of cycles such as just explained, and at the end of a given number of cycles, usually depending upon the number of faces of the turret, the movement of the slide is automatically stopped when it is at the end of its return movement. The constant feeding motion is assured by mechanism which includes a screw operated from and in predetermined timed relation with the spindle and a follower which is carried by the lever. In the application referred to, the valve and lever move with the slide and the screw is stationarily mounted except for its rotative movement. This arrangement of parts has certain advantages, but it lacks other advantages which are secured with the arrangement of this application, wherein the valve and lever are mounted stationarily on the bed, thereby avoiding the use of flexible piping, and the slide moves back and forth relative to them, while the screw, which is adapted to be engaged by a follower carried by the slide, is in this instance connected to the valve and has movement lengthwise of the valve equal to and coincident with the valve at any time. This modified arrangement involves other changes in details for operating the valve and the present arrangement of the main parts referred to and these details constitute the subject matter of the present invention.

In the accompanying drawings:

Fig. 2 is an enlarged side view of a portion of the lathe with parts in section, the control lever and associated parts being in neutral position;

Fig. 3 is a top plan view of the same;

Fig. 4 is a view similar to Fig. 2 with the control lever and associated parts in position for rapid forward movement of the slide;

Fig. 5 is a view similar to Figs. 2 and 4, with the control lever and associated parts in position for the feeding or relatively slow forward movement of the slide, the rear end of the bed being omitted;

Fig. 6 is a view similar to Fig. 5 with the control lever and associated parts in position for the rapid return movement of the slide;

Fig. 7 is a longitudinal sectional view substantially along the line 7—7 of Fig. 3;

Fig. 8 is a fragmentary transverse sectional view similar to Fig. 12 but with the control lever in feeding position;

Fig. 9 is a detail plan view of one of the adjustable cams of a step-by-step rotated cam shaft utilized in controlling one phase of each of the cycles of movement of the slide;

Fig. 10 is an end view of a portion of the lathe with part of the guard for certain gears removed;

Fig. 11 is a transverse sectional view substantially along the irregular line 11—11 of Fig. 3;

Fig. 12 is a sectional view substantially along the line 12—12 of Fig. 5;

Fig. 13 is a fragmentary sectional view substantially along the line 13—13 of Fig. 2;

Fig. 14 is a fragmentary sectional view substantially along the irregular line 14—14 of Fig. 15; and Fig. 15 is a fragmentary sectional view substantially along the line 13—13 of Fig. 2, looking in the opposite direction.

Figure 1:
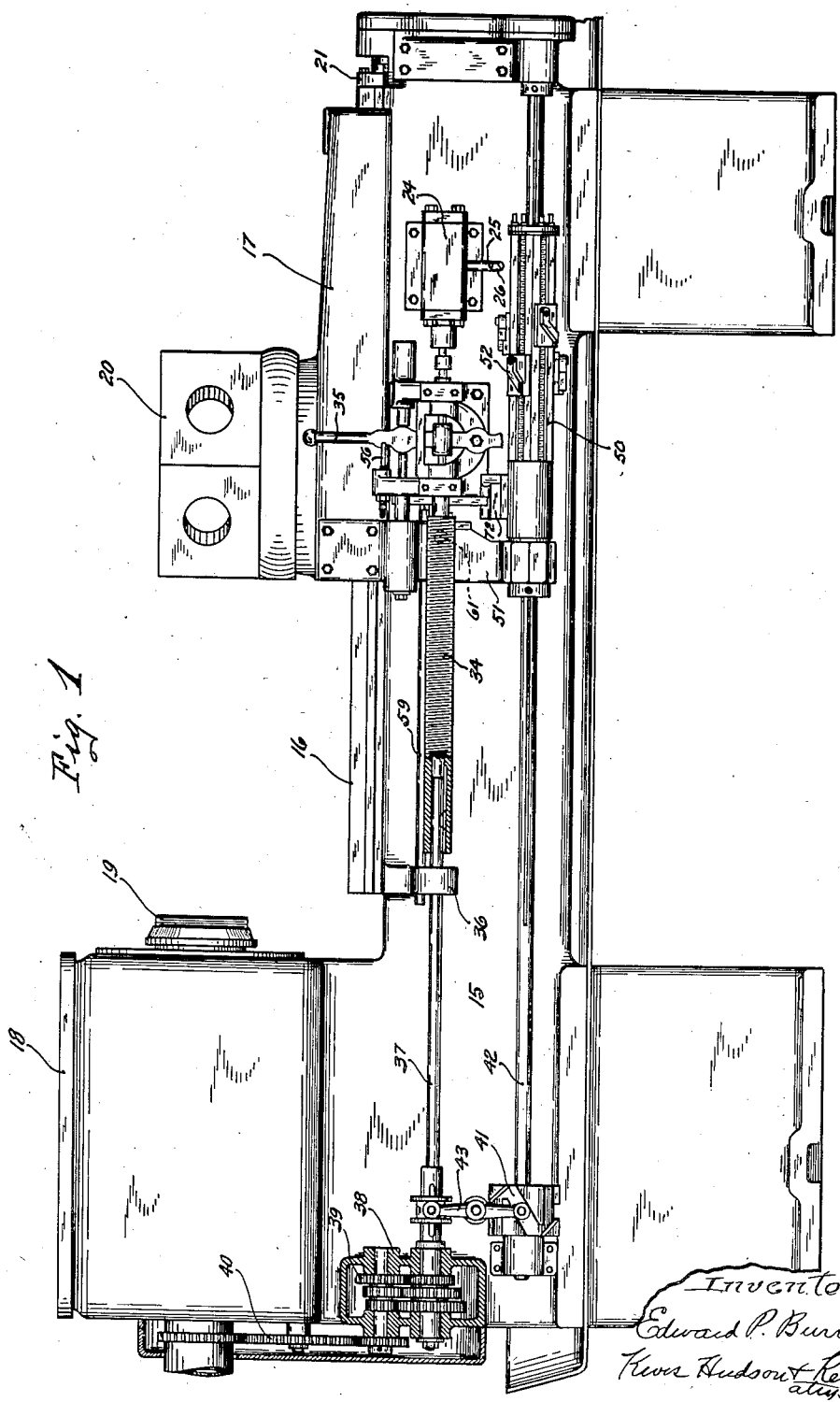
Figure 1 is a side view of a turret lathe having my control system applied thereto.

Referring now to the drawings, the machine tool or lathe is provided with a bed 15 having ways 16 on which the hydraulically actuated sliding member, in this instance in the form of a tool supporting turret slide 17, is mounted, this slide being movable toward and from the head 18 having a work spindle 19 which in this instance supports and rotates the work. In some instances the work piece is supported in the sliding member and the tool or tools in the relatively stationary member in so far as longitudinal movement is concerned, and, of course, the invention is equally applicable to that type of machine tool.

In a machine of the type herein illustrated, provided with a turret slide 17 having a tool holding turret 20, the tools are mounted on the several faces of the turret, here illustrated as six in number, the tools being caused to successively operate on the work and each cycle of movement including a rapid forward movement to bring the tool adjacent the work, then a relatively slow feeding movement for the cutting operation, then the stopping of the forward feeding movement, followed by a predetermined dwell of the tool at the completion of the cut, then a relatively rapid return movement back to the point where the cycle is to be repeated. Near the end of the return movement, the turret is indexed, in this instance being moved through one-sixth of a revolution, so as to properly position the tool which is supported on the next or adjacent face of the turret and which operates during the next cycle of operations.

Many of the parts of the turret lathe may be of standard construction. For example, the work spindle may be rotated at any one of a plurality of speeds by standard multiple speed gearing usually contained in the head of a machine of this kind. Likewise, the indexing mechanism for the turret may be any of the usual standard forms employed in the customary mechanically operated turret lathes wherein the turret indexing takes place automatically during the latter portion of the return movement of the turret slide with any of the usual turret clamping or locking devices. As these are standard in machines of this kind, they are not herein illustrated.

As before stated, the turret slide 17 of this machine is moved back and forth over the ways 16 hydraulically, and by this is meant, of course, by means of a suitable relatively movable cylinder and piston and a suitable actuating fluid, generally a special oil, which is supplied through a valve on either side of the piston by a pump which may be of any of the standard forms employed in hydraulic operating systems of this general character. Of course, any suitable pump which supplies the fluid at a suitable pressure may be utilized which pump will have the usual relief valve which will act at any predetermined pressure. The pump itself is not herein illustrated, but the connections will be referred to presently.

In this instance, the cylinder 21 and the piston and piston rod 22 which actuate the turret slide 17 are mounted in the bed 15, note particularly Figs. 3, 11 and 12. For convenience, the cylinder 21 is attached in any suitable manner to the lower side of the turret slide and the piston and piston rod are stationary, Fig. 3 showing the end of the piston rod 22 suitably secured in the rear end of the bed 15. The actuating fluid is supplied to the cylinder on opposite sides of the piston through the medium of a valve including a valve chamber 24 which, in this instance, is secured to the front part of the bed. Fluid is supplied from the pump, not shown, to the valve chamber under suitable pressure by a pipe 25 and is exhausted from the valve chamber by a pipe 26, see Fig. 11. The valve chamber has delivery connections to the cylinder on opposite sides of the piston. These connections may be established in different ways, but in this instance by pipes 27 and 28 which are connected to passageways 27ª and 28ª respectively, extending through the piston rod 22 and having outlets on opposite sides of the piston. The pipe 27 and the passageway 27ª are for the purpose of supplying motive fluid to give the slide a forward movement and the pipe 28 and passageway 28ª supply the fluid to the cylinder for causing the return movement of the slide. It will be understood that when the fluid is being supplied by the pipe 27 and the passageway 27ª to one side of the piston, the fluid is being exhausted from the other side by way of passageway 28ª and pipe 28, and when fluid is supplied to actuate the slide by way of the pipe 28 and passageway 28ª to the other side of the piston, the pipe 27 and passageway 27ª exhaust the fluid from the opposite side of the piston.

The valve chamber consists of a main body in which a cylindrical bore is formed for the movable valve member, the ends of the bore being closed by end plates 24ª, one having a suitable stuffing box formed thereon. Slidable endwise in the bore of the valve chamber is a valve 24ᵇ which preferably has two cylindrical end portions connected by a reduced skeleton portion, the cylindrical portions being adapted to cover and uncover ports in the cylindrical bore of the valve chamber, which ports communicate with the delivery and exhaust pipes 27 and 28, see particularly Fig. 3. This valve member, which is designed to have endwise horizontal movement in the chamber has connected to it a valve rod 29 which extends through the stuffing box referred to, and this valve rod is connected in this instance by a coupling 30 to a rod 31 which extends through two aligned bearing bosses 32ª and 32ᵇ of a rocking member 32 journaled for rocking movement in arms 33 secured to the front side of the bed 15. The forward end of the rod 31 is connected to a hollow tubular member in the form of a screw 34, to be referred to presently (see Fig. 6). It might be here stated that the screw 34, which is designed to be rotated as hereinafter explained, has a connection with the rod 31 such that the screw may be turned relative to the rod 31 but will move endwise with it and in so moving the rear end of the screw is supported by and is slidingly mounted on an extension on one of the bosses 32ᵇ of the rocking member 32, see particularly Fig. 6.

The portion of the rocking member 32 below the bosses 32ª is substantially U-shaped, and on the portion of the rod 31 between the arms of the U, the rod has an enlarged portion forming two spaced shoulders 31ª which receive a somewhat enlarged portion of a control lever 35. This lever is supported for rocking movement forwardly and rearwardly by virtue of the rocking member 32 and for rocking movement laterally, the lower end of the lever being connected by a bearing pin 35ª to the lower part of the rocking member 32. The arrangement is such that as the lever is moved laterally an endwise movement is transmitted through the rod 31 and valve rod 29 to the movable valve member 24ᵇ, and since the actuating rod 31 passes through the trunnion supports 32ª and 32ᵇ of the rocking member 32, it will be obvious that the lever 35 and the rocking member 32 supporting it may be rocked inwardly and outwardly about the axis of the rod 31 and the valve rod 29, this rocking movement having no effect on the valve member 24ᵇ so far as endwise movement thereof is concerned. The valve member 24ᵇ may rock with the lever or the coupling 30 may be such that no rocking movement is imparted to it, depending upon the form of coupling used.

The screw 34 which, as already stated, is connected to the valve rod 29 and at one end has a sliding engagement and a bearing on the boss 32ᵇ, has its other end supported by a shaft 37 adjacent a bearing 36 for the shaft (see Fig. 1). This screw is rotated by shaft 37 which shaft has a splined relation with respect to the screw so as to rotate the latter but permits it to have an endwise movement relative to the shaft. This shaft has its forward end supported in the gear box 38 and is driven by the work spindle 19 and always in predetermined timed relation therewith. The speed of the shaft 37 may be varied with respect to the rotation of the work spindle, and in this instance the shaft is designed to be driven by the spindle by change speed gearing 39 located in the gear box 38 and by gears 40 which connect this change speed gearing to the work spindle. In some machines it may never be necessary to vary the rotation of the shaft 37 with respect to the work spindle, but in others it may be desirable and provision is here made for changing the rate of rotation of the shaft relative to the rotation of the work spindle. The speed change may be effected manually or automatically, and in this instance I have shown provision for effecting it automatically by the operation of a cam drum 41 carried by a shaft 42 rotatably supported on the front side of the bed. A lever 43 actuated by the drum is adapted to shift a slidable key or other gear changing element. An additional function and the method of rotating the shaft 42 will be referred to presently.

It is customary in turret lathes to provide a so-called stop roll with a series of adjustable stops thereon to positively stop the forward motion of the turret slide at the completion of the cutting operation. This stop roll is usually in the form of a polygonal drum having as many faces as there are faces on the turret and the stops for the different cycles of movement of the slide are secured to the different flat faces of the drum or roll. In this instance I use a stop roll, the same being illustrated in Figs. 3, 7 and 12, at 44, this stop roll being supported by and movable with the slide. It is connected with the turret by any suitable gearing 45 (Fig. 7) so that the roll will be given a step-by-step rotation each time the turret is indexed. The stops, which are adjustably mounted on the roll, are shown at 46, one of these stops at the end of each forward motion of the slide coming into contact with a suitable fixed stop indicated at 47 in Figs. 3 and 12, this stop being integral with or secured to the bed.

The stop roll 44 is in keyed relation with a shaft 48 supported partly by the stop roll and partly by the rear end of the bed and the rear end of this shaft is connected by gearing 49 (Figs. 7 and 10) to the shaft 42 previously referred to. On this shaft is mounted a cam roll 50 which has a keyed relation with the shaft and moves back and forth with the slide being connected therewith through the medium of an arm 51 extending downwardly along the front of the bed, as indicated in Figs. 6 and 13. This cam roll carries a series of cams 52 adjustably mounted on the faces of the roll, each cam being adjustable along the length of the roll by a screw 53 or by other suitable means. There are as many of these cams as there are faces of the turret, and each cam is utilized in one cycle of movement of the turret slide, the function being, on the forward movement of the slide and therefore of the cam roll and cams, to engage the lower end 35ᶜ of the control lever 35 and thus rock the same outwardly from the position shown in Fig. 12 to the position shown in Fig. 8. Each of these cams may consist of a suitable block or holder 52ª and a pivoted cam member 52ᵇ which will trip the control lever when the slide is moving forwardly, but on the return movement of the slide and cam roll it will be lifted and will pass freely by the lever without changing its position (see Fig. 9). The functioning of the cams of this cam roll will be explained more fully in the subsequent complete statement of the operation.

Referring again to the control lever 35 and some parts associated with it for the purpose of actuating it to control the rate of movement and direction of movement of the turret slide 17, it will be observed (Fig. 8) that the lower end of the control lever is acted on by a spring plunger 54 which tends to move the lever from its forward position to upright or vertical position, and when the lever is actuated by the spring plunger 54, it is stopped in vertical position by a stop pin 55 which engages a suitable lug on the rocking member 32, see particularly Figs. 8 and 12.

One of the stationary arms 33 which supports the rocking member 32 and therefore the control lever 35 is provided with an adjustable horizontally extending pin 56, which is termed the dwell pin and which at times extends in front of the lever 35, note Figs. 6 and 12, and at other times the lever is in front of the pin, see Figs. 5 and 8. The function of this dwell pin will be explained presently.

It will be observed also, particularly by reference to Figs. 8 and 12, that the rocking member 32 which supports the control lever has on the rear side thereof a gear segment 57 which engages a gear 58 on a shaft 59 which is supported at one end in one of the stationary arms 33 and at its other end in the arm 51 extending downwardly from the slide, and has sliding engagement in the latter. The segment 57 remains in engagement with the gear 58 at all times, i. e., the center of the gear segment coinciding with the axis of rotation of the rocking member 32. This shaft 59 has at its rear end a gear 60, see Figs. 13 and 16, which engages the rack teeth of a follower 61 slidingly mounted in the arm 51 depending from the turret slide, and at its forward end having a hardened point which is adapted to engage in the thread of the screw 34 which, as already explained, is rotated by shaft 37 geared to the work spindle. It will be obvious that the rocking of the control lever to and from upright position will move the nose of the follower 61 out of and into engagement with the thread of the screw 34. It might be here mentioned that the follower is in engagement with the screw during the feeding movement of the turret slide, the function of these parts being to insure a constant motion of the slide during feed irrespective of a variable leakage factor in the hydraulic system, the action being to move the control lever and therefore the valve (theoretically at least) back and forth slightly to maintain a constant motion during the feed portion of each cycle of the turret slide movements.

To bring about complete automatic operation of the machine tool, two other valve actuating elements are provided, one being in the form of a plunger 62 acted on by a spring 63 and mounted in a barrel 64 forming a part of one of the arms 33 on the bed. This plunger is in the plane of the control lever 35 when the latter is in its vertical or upright position, and at a given time in each cycle of movement of the turret, this plunger is released and throws the control lever from the position for forward motion (Fig. 4) to the position for reverse movement of the slide (Fig. 6).

For the purpose of controlling and timing the action of this plunger, a pivoted catch 65 is provided on the arm 33, the forward end or nose of this catch being at times adapted to engage over the front end of the plunger when the latter has been moved back so as to compress the spring 63 (see Fig. 3). To disengage the catch from the plunger when the plunger is to shift the control lever, there is provided on the rear side of the control lever a latch 66 acted on by a weak spring 66ᵃ to normally hold the the same against a stop 66ᵇ shown in Figs. 2, 8 and 12.

There is provided for the automatic shifting of the control lever from the position shown in Fig. 6 to the position shown in Fig. 4, to stop the return movement of the slide and start its rapid forward motion, a second spring plunger 67 acted on by a spring 68 carried in a barrel 69 forming a part of or secured to the arm 51 depending from the turret slide, as before stated (see Fig. 3). Except when the slide is near the rear portion of its motion, the plunger is in its forwardmost position, the spring 68 then being expanded. A shoulder, here shown in the form of a washer carried by the plunger, abuts against the rear end of the barrel 69. During the return motion of the slide and when the latter is near the end of its return motion, the forward end of the plunger is adapted to engage a pivoted latch 70 which is carried at the side of the adjacent arm 33 on the bed, see Figs. 6, 14 and 15. This latch is pivoted on the arm 33 and is normally held in the full line position shown in Fig. 15 against a stop pin 70ᵃ by a spring plunger 70ᵇ engaging the upper part of the latch. When the turret slide is approaching the end of its return motion, the plunger 67 engages this latch 70 and is pushed back into the barrel, compressing the spring 68 until it reaches the position indicated in Fig. 14 and then a slight additional rearward movement causes a cam 71, which is carried by the arm 51 of the slide, see particularly Figs. 14 and 15, to engage and rock the latch 70 to the dotted line position shown in Fig. 15. This moves the upper part of the latch from in front of the spring plunger and thereby releases it so that the spring 68 back of the plunger may throw the plunger forwardly and thereby shift the control lever from the position shown in Fig. 6 (reverse movement of the slide) to the position shown in Fig. 4 (rapid forward movement of the slide). During this movement of the control lever from the position shown in Fig. 6 to the position shown in Fig. 4 by the spring plunger 67, the other spring plunger 63 is moved inward, compressing the associated spring 63 until the nose of the latch 65 comes in front of the spring plunger 62, it being understood that the spring 68 behind plunger 67 is much stiffer than spring 63 behind the plunger 62.

By the construction described above, the slide will pass through its various cycles of movement, each cycle including a rapid forward motion and then a relatively slow feed motion, and, after the predetermined dwell with the slide stationary, a rapid return motion, after which the next cycle is started. In a machine of this kind it is desirable that the slide be brought to a stop after a predetermined number of cycles of movement to permit the workman to unload the finished work piece and to place a new work piece in the chuck which is generally supported by the work spindle. Provision is made for this in the mechanism herein illustrated, the device for this purpose consisting of a special cam 72 which is carried by the cam roll 50, this cam being illustrated in Figs. 2, 6 and 15. This cam is so positioned that near the end of the last cycle of the series and when the slide is on its return motion, it engages the lower end of the latch 70 and rocks it to the dotted line position shown in Fig. 15 so that the forward end of the spring plunger 67 cannot engage the latch, thus preventing the plunger being pushed back into the barrel and preventing the compression of the spring 68. The result is that as the slide completes its rearward movement the spring plunger 67 remains in its forward position and pushes the control lever to neutral position, thus stopping the motion of the slide, whereas in the preceding cycles the forward motion for the next cycle was immediately initiated.

The operation is as follows: When the machine is to be started, with the work in the chuck on the work spindle, the control lever is in neutral position illustrated in Figs. 2 and 3, that is to say, the lever is in its mid position so far as lateral swinging movement is concerned, and it is in vertical or upright position and the other parts are in the position shown in Figs. 2 and 3. The operator then grasps the lever and moves it to the right from the position illustrated in Fig. 2 to the position shown in Fig. 4. This movement pushes in the spring plunger 62, compressing the spring 63 until the nose of the latch 65 snaps in front of the plunger. The movement of the control lever causes the valve to be moved to the position shown in Fig. 4 and causes the rapid forward motion of the slide. The forward motion continues until one of the cams 52 on the cam roll engages the lower end of the lever 35 and rocks it forwardly, as shown in Fig. 8. In so doing, the gear segment 57 on the lever turns the gear 58 on shaft 59, causing the shaft and gear 60 to be turned, and this in turn, acting on the teeth of the follower 61, moves the nose of the latter into the thread of the screws 34. The slide still being in rapid forward motion, the effect of the follower on the screw is to move the screw endwise and thus shift the rod 31 and movable valve member and at the same time rock the control lever to feeding position which is illustrated in Fig. 5. This brings the lever in front of the dwell pin 56, as illustrated in Figs. 5 and 8, this dwell pin preventing the lever from being again restored to upright position under the action of spring plunger 54 when the cam 52 shown in Fig. 8 has passed beyond the lever, all the parts now being in the position shown in Fig. 5. The feed motion of the slide which was initiated by this movement of the lever continues throughout the balance of the forward motion of the slide and when one of the adjustable stops 46 engages the fixed stop 47, the forward motion of the slide is stopped. The forward motion of the slide now being stopped, and the movement of the follower being stopped, the now stationary follower has the effect of moving the screw 34 endwise, due to the fact that the screw of course continues its rotation and the effect of this is to gradually move the control lever to the right until it has passed beyond the adjustable dwell pin, and when this occurs, the spring plunger 54 throws the lever back to upright position as shown in Fig. 12, and when this occurs, the latch 66 engages and moves the nose of the catch 65 from in front of spring plunger 62, whereupon the plunger is released and throws the control lever to the left or to the position shown in Fig. 6, which is the reverse position, and this immediately starts the rapid return movement of the slide. The slide now returns and when it is near the end of its return movement, the turret is indexed and this turns the stop roll 44 and the cam roll 50. When the slide is near the end of its return movement, the spring plunger 67 engages the upper end of latch 70, causing the plunger to be pushed inward as the rearward movement of the slide continues, and when rearward movement is practically completed, cam 71, which is moving back with the slide, engages the lower end of the latch 70, moving it to the dotted line position shown in Fig. 15 and releasing the plunger 67 so that it throws the control lever from the position of Fig. 6 to the position of Fig. 4, thus starting the rapid forward movement of the slide which is the first part of the next cycle. During this movement of the lever to the position shown in Fig. 4, spring plunger 62 is pushed back into the barrel, compressing spring 63 until the nose of the catch 65 again drops in front of the plunger. Thus the next cycle is initiated and the cycles continue in this manner until the slide has passed through a predetermined number of cycles (six in this instance), and at the end of the sixth cycle the movement is automatically stopped by the action of the cam 72 on the cam roll which prevents the latch 70 from functioning, allowing the control lever and valve to be brought to neutral position by the plunger 67 which at this time remains in its forwardmost position.

Thus the mechanism herein illustrated provides for full automatic operation and the slide is operated and controlled as with the control system illustrated in my prior application but with an arrangement and construction of parts which in some respects have advantages over the arrangement and construction of my prior application, it being noted that in this instance the valve and the control lever are stationarily mounted on the bed while the follower which engages the screw is carried by the slide and the screw is capable of endwise movement and has a connection with the valve rod. This does away with the necessity for flexible connections at any point in the hydraulic system and the control lever has a definite position on the bed irrespective of the position of the slide.

In my prior application, I noted the fact that it is desirable that at times the valve be under manual control so that the slide can be moved back and forth whenever and as much as desired, especially when trial cuts are being made, and in the prior application provision was made for that by making it possible to disengage the follower from the screw. While I have not shown provision for this in this instance, it will be understood that if manual operation is desired, it will only be necessary to provide for the manual disengagement of the follower 61 from the screw 34 and this can be accomplished in many different ways.

While I have shown the preferred arrangement and construction, I do not wish to be confined to the precise details shown as many changes may be made without departing from the spirit and scope of the invention as defined in the appended claims.

Having thus described my invention, I claim:

1. The combination with a member to be moved, of hydraulic means for actuating it including a source of fluid supply, and a control valve, and means for maintaining a constant motion for said member irrespective of leakage including a rotatable screw connected to and shiftable with the valve, and a follower means for rotating said screw at a constant rate, movable with said member and engaging the screw.

2. The combination with a support, of a slide movable thereon, hydraulic means for operating the slide including a source of fluid supply, a motor, and a control valve, a follower carried by the slide, a screw adapted to be engaged by said follower having a connection with and shiftable with the valve, and means for rotating said screw at a constant rate.

3. The combination with a support, of a slide mounted thereon, hydraulic means for actuating the slide including a motor, a source of fluid supply and a control valve, automatic valve shifting means acting on the valve to maintain a constant motion for said slide for a portion of its movement irrespective of leakage, and additional valve shifting means acting on the valve to vary the rate of movement of the slide, the valve including a valve chamber or casing stationarily mounted with respect to the slide.

4. The combination with a support, of a slide movable thereon, hydraulic means for actuating it including a source of fluid supply, a motor connected to the slide, a valve, a control lever for the valve, automatic valve shifting means acting on the valve to maintain a constant motion for the slide for a portion of its movement irrespective of leakage, and additional automatic valve shifting means acting on the valve to vary the rate of movement of the slide, both the valve and the valve lever having stationary mountings with respect to the slide movements.

5. In a machine tool, a bed, a slide, a rotary member, hydraulic means for actuating the slide including a motor, a source of fluid supply, a valve, a lever for actuating the valve, the valve and lever being mounted on the bed, and means for maintaining a constant motion for the slide for a portion of its movement irrespective of leakage, said means including a part having a movement in timed relation with said rotary member and having a connection with and shiftable with the valve, and a part engageable with the first named part and movable with the slide.

6. In a machine tool, a bed, a slide, a movable member, hydraulic means for actuating the slide including a motor, a source of fluid supply, and a control valve mounted on the bed, means for automatically actuating the valve to vary the movements of the slide, and means for maintaining a constant motion for the slide during a portion of its movement irrespective of leakage, said means including a part having a movement in timed relation with the movement of said movable member and having a connection with and shiftable with the valve, and a part engageable with the first named part and movable with the slide.

7. In a machine tool, a bed, a slide, a rotary spindle, hydraulic means for actuating the slide including a motor, a source of fluid supply, and a control valve, the valve being mounted on the bed, means for automatically actuating the valve to vary the movements of the slide, and means for maintaining a constant motion for the slide during a portion of its movement irrespective of leakage, said means including a member rotating in timed relation with the spindle and having a connection with and shiftable with the valve and a cooperating member carried by the slide.

8. In a machine tool, a bed, a slide, spindle, hydraulic means for actuating the slide including a motor, a source of fluid supply, and a control valve mounted on the bed, means for automatically actuating the valve to vary the movements of the slide, and means for maintaining a constant motion for the slide during a portion of its movement irrespective of leakage, said means including a screw connected with and shiftable with the valve, means for driving said screw at predetermined speeds, and a follower carried by the slide and engageable with the screw.

9. In a machine tool, a bed, a slide, a rotary spindle, hydraulic means for actuating the slide including a motor having a part connected with the slide, a source of fluid supply, a valve, and a control lever therefor, both the lever and valve being mounted on the bed, and means for automatically actuating the control lever to shift the valve and thereby vary the movements of the slide, and means for maintaining a constant motion for the slide during a portion of its movement including a follower carried by the slide, and a screw rotated in timed relation with the spindle and having a connection with and shiftable with the lever and valve.

10. In a machine tool, a bed, a spindle, a slide, hydraulic means for actuating the slide including a motor having a part connected with the slide, a source of fluid supply, and a valve, and means for maintaining a constant motion for the slide during a portion of its movement including a shaft rotating in timed relation with the spindle, a screw rotated by and movable endwise with respect to the shaft and having a connection with and shiftable with the valve, and a follower engageable with the screw and carried by the slide.

11. In a machine tool, the combination of a frame, a movable member supported thereby, a fluid pressure actuated motor for moving said member, a valve for controlling the flow of fluid to said motor mounted on said frame, a control member connected to said valve and having movement independent thereof and also movement therewith, and means operatively connecting said movable member and said control member for controlling said valve to move said movable member in predetermined relation to the independent movement of said control member.

12. In a machine tool, the combination of a frame, a movable member supported thereby, a fluid pressure actuated motor for moving said member, a valve for controlling the flow of fluid to said motor mounted on said frame, a control member connected to said valve and having independent movement and also movement therewith, a member operatively connected with said movable member and said control member for controlling said valve to move said movable member in predetermined relation to the independent movement of said control member, and means for moving said last member to disconnect the operative connection between said movable member and said control member.

13. In a machine tool, the combination of a frame, a movable member supported thereby, a fluid pressure actuated motor for moving said member, a valve for controlling the flow of fluid to said motor mounted on said frame, a control member connected to said valve and movable therewith, means for moving said control member at a constant velocity and independently of the valve, and means adapted to operatively connect said movable member and said control member for controlling said valve to move said movable member at a constant rate.

14. In a machine tool, the combination of a frame, a plurality of movable members supported by said frame, a fluid pressure actuated motor for moving one of said members relative to the other, a valve for controlling the flow of fluid to said motor mounted on said frame, a control member connected to said valve and movable therewith, and means operatively connecting said control member with said movable members for controlling said valve to move one of said movable members in predetermined relation to the movement of the other of said movable members.

15. In a machine tool, the combination of a frame, a plurality of movable members supported thereby, a fluid pressure actuated motor for moving one of said members relative to the other, a valve for controlling the flow of fluid to said motor mounted on said frame, a control member connected to said valve and movable therewith, means operatively connecting said control member with said movable members for controlling said valve to move one of said movable members in predetermined relation to the movement of the other of said members, and means for disconnecting the operative connection between said control member and one of said movable members.

16. In a machine tool, the combination of a frame, a plurality of movable members supported thereby, a fluid pressure actuated motor for moving one of said members relative to the other, a valve for controlling the flow of fluid to said motor mounted on said frame, a control member connected to said valve and movable therewith, means operatively connecting said control member and said movable members for controlling said valve to move one of said movable members in predetermined timed relation to the movement of the other of said movable members, means for disconnecting the operative connection between said control member and one of said movable members, and means for varying the predetermined timed relation between said movable members.

17. In combination, a movable member, a fluid pressure operated motor for moving said movable member, a valve for controlling the flow of fluid to said motor, means for actuating said valve to reverse the operation of said motor, a holding member for rendering said means inoperative, and cam means carried by said movable member for releasing said holding member.

18. In combination, in a machine tool having a series of successive working cycles, a movable member adapted to be moved through a plurality of cycles, a fluid operated motor for moving said movable member, a valve for controlling the flow of fluid to said motor, means for actuating said valve to reverse the operation of said motor, a holding member for rendering said means inoperative, cam means carried by the movable member for moving said holding member to release said means at the end of each cycle of operation.

19. In combination, in a machine tool having a series of successive working cycles, a support, a movable member carried thereby, a fluid pressure operated motor for moving said member relative to said support, a valve for controlling the flow of fluid to said motor, means for actuating said valve to reverse the operation of said motor, a holding member for rendering said means inoperative, cam means carried by said movable member for releasing said holding member after each operative cycle, and a second cam means carried by said movable member for rendering said first cam means ineffective after a predetermined number of cycles.

20. In combination, in a machine tool having a series of successive working cycles, a support, a slide supported thereby, a movable member supported by said slide, a fluid pressure operated motor for moving said slide through a plurality of cycles, a valve for controlling the flow of fluid to said motor, means for controlling said valve to reverse the operation of said motor, a holding member for rendering said means inoperative, cam means carried by said slide actuating said holding member to release said means at the end of each cycle, and cam means carried by said movable member for rendering said holding member ineffective after a predetermined number of cycles.

21. In a machine tool, the combination of a frame, a slide supported by said frame, a fluid pressure actuated motor for reciprocating said slide, an indexible turret supported by said slide, a valve for controlling the flow of fluid to said motor mounted on said frame, a cam roll carried by said slide adapted to be indexed with said turret, cams on said cam roll adapted to control said valve to vary the rate of movement of said slide, and control means for said valve connected thereto and having movement independently thereof adapted to maintain the movement of said slide constant during a portion of each reciprocation, said control means also having an operative connection with said slide.

22. In a machine tool, the combination of a frame, a rotatable spindle supported by said frame, a slide supported by said frame, a fluid pressure actuated motor for reciprocating said slide, an indexible turret supported by said slide, a valve for controlling the flow of fluid to said motor, a cam roll carried by said slide and indexible with said turret, cams on said cam roll adapted to control said valve to vary the rate of movement of said slide, and means for maintaining a constant motion for said slide during a portion of each reciprocation, said means including a member rotated in timed relation with the rotation of said spindle and having a connection with and shiftable with said valve, and a cooperating member carried by said slide.

EDWARD P. BURRELL.